(12) United States Patent
Kojima et al.

(10) Patent No.: US 11,800,185 B2
(45) Date of Patent: Oct. 24, 2023

(54) IMAGE TRANSMISSION AND RECEPTION SYSTEM, DATA TRANSMISSION AND RECEPTION SYSTEM, TRANSMISSION AND RECEPTION METHOD, COMPUTER PROGRAM, IMAGE TRANSMISSION SYSTEM, IMAGE RECEPTION DEVICE, TRANSMISSION SYSTEM, RECEPTION DEVICE

(71) Applicant: DWANGO Co., Ltd., Tokyo (JP)

(72) Inventors: Takashi Kojima, Tokyo (JP); Kazuhiko Kusano, Tokyo (JP); Hajime Kato, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 84 days.

(21) Appl. No.: 17/418,233

(22) PCT Filed: Sep. 25, 2019

(86) PCT No.: PCT/JP2019/037580
§ 371 (c)(1),
(2) Date: Jun. 24, 2021

(87) PCT Pub. No.: WO2020/137050
PCT Pub. Date: Jul. 2, 2020

(65) Prior Publication Data
US 2022/0070527 A1    Mar. 3, 2022

(30) Foreign Application Priority Data

Dec. 28, 2018 (JP) .................................. 2018-248974

(51) Int. Cl.
*H04N 21/4402* (2011.01)
*H04N 21/235* (2011.01)
*H04N 21/25* (2011.01)

(52) U.S. Cl.
CPC ....... *H04N 21/4402* (2013.01); *H04N 21/235* (2013.01); *H04N 21/251* (2013.01)

(58) Field of Classification Search
CPC . H04N 21/4402; H04N 21/235; H04N 21/251
See application file for complete search history.

(56) References Cited

U.S. PATENT DOCUMENTS

| 5,841,904 A | 11/1998 | Sugiura |
| 2013/0170746 A1* | 7/2013 | Zhang .................. H04N 19/132 382/209 |

(Continued)

FOREIGN PATENT DOCUMENTS

| CN | 106791927 A | 5/2017 |
| CN | 107945108 A | 4/2018 |

(Continued)

OTHER PUBLICATIONS

International Search Report and Written Opinion for PCT/JP2019/037580, dated Dec. 24, 2019.

(Continued)

*Primary Examiner* — Chenea Davis
(74) *Attorney, Agent, or Firm* — Dorsey & Whitney LLP

(57) ABSTRACT

In a system for distributing video image content from a server to a viewer terminal, a configuration is provided in which the load to the transmission path is reduced by reducing the volume of distribution volume while improving the image quality to be viewed. Content data based on a low-bitrate-encoded image and data of an image of a transformation matrix in a neural network which is model data for obtaining an image close to an original image from the low-bitrate-encoded image are transmitted to the viewer terminal from the video image content distribution server. These data are used by the viewer terminal to obtain improved video image content.

17 Claims, 10 Drawing Sheets

(56) References Cited

U.S. PATENT DOCUMENTS

2018/0139458 A1* 5/2018 Wang .................... H04N 19/17
2023/0142432 A1 5/2023 Kojima et al.

FOREIGN PATENT DOCUMENTS

| CN | 110754093 A | 2/2020 |
|---|---|---|
| GB | 2548749 A | 9/2017 |
| JP | H04302272 A | 10/1992 |
| JP | H05191796 A | 7/1993 |
| JP | 2015201819 A | 11/2015 |
| JP | 5956761 B2 | 6/2016 |
| JP | 2016534654 A | 11/2016 |
| JP | 2017049686 A | 3/2017 |
| JP | 2017123649 A | 7/2017 |
| JP | 2017158067 A | 9/2017 |
| JP | 2017195429 A | 10/2017 |
| JP | 2019129328 A | 8/2019 |
| JP | 2020524418 A | 8/2020 |
| WO | 2017164297 A1 | 9/2017 |
| WO | 2019225793 A1 | 11/2019 |
| WO | 2020137050 A1 | 7/2020 |
| WO | 2021221046 A1 | 11/2021 |

OTHER PUBLICATIONS

[English Translation] First Office Action for Chinese Patent Application No. 201980077647.5, dated Dec. 20, 2022, pp. all.
International Search Report and Written Opinion for PCT/JP2021/016747, dated Jun. 21, 2021, pp. all.
Dong, Chao , et al., "Image Super-Resolution Using Deep Convolutional Networks", IEEE Transactions on Pattern Analysis and Machine Intelligence, vol. 38, No. 2,, Jan. 6, 2015, pp. 295-307.
Decision of Rejection for Chinese Patent Application No. 201980077647.5 dated Jul. 20, 2023, pp. all.
Notice of First Review Opinion for Chinese Patent Application No. 202180014290.3 dated May 18, 2023, pp. all.

* cited by examiner

IMAGE TRANSMISSION AND RECEPTION SYSTEM, DATA TRANSMISSION AND RECEPTION SYSTEM, TRANSMISSION AND RECEPTION METHOD, COMPUTER PROGRAM, IMAGE TRANSMISSION SYSTEM, IMAGE RECEPTION DEVICE, TRANSMISSION SYSTEM, RECEPTION DEVICE

RELATED APPLICATIONS

This application is a 371 National Stage application claiming priority to International Application No. PCT/JP2019/037580, filed Sep. 25, 2019, which claims priority to Japanese Patent Application No. 2018-248974 filed on Dec. 28, 2018. The aforementioned applications are incorporated herein by references, in their entirety, for any purposes.

TECHNICAL FIELD

The present disclosure relates to an image transmission and reception system, a data transmission and reception system, a transmission and reception method, a computer program, an image transmission system, an image reception device, a transmission system, and a reception device, and particularly relates to a configuration suitable for a video image distribution system that distributes video image content from a distribution server to a client terminal for a viewer.

BACKGROUND ART

There has been an image distribution system such that image content which is a combination of a video image with a still image, and as needed, with audio (which is so called and hereinafter referred to as "image program", "program", "content") is distributed from a distribution server to a client terminal used by a viewer, so that the viewer is able to browse the image content displayed on a display screen of the client terminal.

For example, Patent Document 1 listed below discloses the following system configuration, in its FIG. 1 and paragraphs 0012 to 0016, and paragraphs 0032 to 0035. Namely, the system configuration includes a streaming server 300 configured to distribute a plurality of sets of video image data, and a plurality of terminal devices 400 connected to the streaming server 300 via a network 500. Each of the terminal devices 400 is capable of selectively accepting a desirable set of video image data from a plurality of sets of video image data according to a selecting operation performed by a user.

CITATION LIST

Patent Documents

Patent Document 1: Japanese Patent No. 5956761
Patent Document 2: Japanese Unexamined Patent Publication No. 2017-123649
Patent Document 3: Japanese Unexamined Patent Publication No. 2017-49686
Patent Document 4: Japanese Unexamined Patent Publication No. 2017-158067
Patent Document 5: Japanese Unexamined Patent Publication No. 2015-201819

SUMMARY OF THE INVENTION

Technical Problem

Video image content particularly has a large volume of data to be transmitted. This causes an increase in the load on a communication path such as a broadband network including the internet communication network, when distributing video image content from a content distribution server (distribution source) to a viewer terminal (distribution destination) via the communication path. If the number of terminals of the distribution destination increases, or distribution concentrates in a certain time, there is a further concern that data transmission may be congested, or distribution may be interrupted.

To address this, Patent Document 2 listed above discloses a video encoding system and contains the following matters in its paragraphs 0024 to 0025. According to the disclosure, in a system for transmitting and receiving video streaming for viewing a video through the internet communication network having a limited bandwidth, it is necessary to use an efficient digital video encoding that could substantially reduce data ratio of digital video signals for the purpose of compressing video data. To this end, the encoder of the system disclosed in Patent Document 2 divides a video stream into a plurality of scenes. Each of the scenes is sorted into different scene types such as "high-speed motion", "still", "talking heads", "text", "scroll credit", "mostly dark image", "short scene of 5 image frames or less", and the like. Then, each scene type is encoded with video encoding parameters (image encoding parameters) pre-defined for the scene type to output the video stream.

On the other hand, as an option of highly efficient band compression of the video image content, there is a method of reducing the transmission rate (bitrate) for transmitting video image content, so as to transmit a small data amount. This method, however, leads to deterioration of the image quality due to the reduced data amount in the video image content data. That is, detail information may be lost and displayed images tend to contain block noise and mosquito noise, which leads to dissatisfaction of the viewer (user).

Meanwhile, there are several suggested configurations (although these configurations are not intended for application to a video image content distribution system), including a configuration using a machine learning technique including deep learning, to modify image data with missing details so as to improve the definition and generate an image close to the original image.

For example, Patent Document 3 listed above discloses a technology for restoring a high-quality image from a low-quality image (hereinafter referred to as "super-resolution technique"). The entire process is divided into a learning process which is a process of dictionary database for use in restoration, and a restoring process of restoring a high quality image from a low quality image by using the dictionary database (paragraph 0043). According to the disclosure, a learning type super-resolution technique is used. In this technique, the learning process creates pairs of images, each of the pairs including a high-resolution image having a very small size, which derives from a local area of a learning image and a deteriorated image of the same local area of the same learning image, which is created by deteriorating the image quality of the high-resolution image. Then, the restoring process restores a high quality image by cutting out a patch image from a low quality image to be restored, specifying, from the dictionary database, a learned deteriorated image of a very small size, which resembles to the patch image, and integrating the high-resolution image paired with the deteriorated image.

Patent Document 4 also aims at restoring a high-resolution image by using deep learning. To provide a monitoring system capable of more accurately performing monitoring for a scene which is likely to have a plurality of types of shooting targets appeared (paragraph 0004), a configuration disclosed in the reference performs a super-resolution technique by using dictionary data 64 corresponding to the types of the shooting targets, as described in paragraphs 0015, and 0029 to 0041. To obtain an image having been subjected to a super-resolution process, the configuration generates the dictionary data 64 containing a coefficient needed at a time of executing a convolution arithmetic operation by, for example, learning many combinations of high-resolution data (correct data) and low-resolution data by using a technique such as deep learning, and a subsequent-stage image processing unit 54 uses this generated dictionary data 64 by the learning, to execute the convolution arithmetic operation with respect to an actually obtained image to obtain a high-resolution image (enlarged image).

Further, Patent Document 5 which also aims at restoring a high-resolution image by using deep learning discloses a system for improving an image quality of a deteriorated video image which is recorded on an analog storage medium (a videotape, a film, and the like).

However, none of the above-mentioned patent documents disclose nor do they suggest a configuration that allows distribution of a large volume of image data such as video image content with a reasonable image quality, while reducing the load on a communication path and the like, when distributing the video image content from a distribution source to a distribution destination as hereinabove described.

To address the above-described problem which is not solved by traditional art, an object of the present invention is to provide an image transmission and reception system, a data transmission and reception system, a transmission and reception method, a computer program, an image transmission system, an image reception device, a transmission system, and a reception device, each of which efficiently implements both efficient compression of transmission band and restoration of images having a resolution similar to that of the original image, while reducing a burden on an operator, in a system that performs transmission and reception of video streaming for viewing video image content, via a transmission path having a limited bandwidth such as the internet communication network.

Solution to the Problem

To solve the above-described problems, the present disclosure provides an image transmission and reception system, a data transmission and reception system, a transmission and reception method, a computer program, an image transmission system, an image reception device, a transmission system, and a reception device, as set forth in the following items.

1)

An image transmission and reception system is such that at least one of one or more transmission devices includes a machine learning unit that generates, through machine learning, model data from low-bitrate-encoded images obtained by encoding original images with a low bitrate, the model data for generating improved images close to the original images; the at least one of the one or more transmission devices includes a transmitter that transmits the low-bitrate-encoded images along with the model data outside the at least one of the one or more transmission devices; and a reception device includes an improved image generating unit that generates the improved images of the low-bitrate-encoded images, from the low-bitrate-encoded images and the model data received.

2)

The image transmission and reception system of 1) may be such that data used in the machine learning further includes meta information of the low-bitrate-encoded images.

3)

The image transmission and reception system of 2) may be such that the meta information of the low-bitrate-encoded images is at least one of a coding block quantization parameter (QP), a prediction error coefficient, prediction mode information, or motion vector information of an image encoding technique.

4)

The image transmission and reception system of any one of 1) to 3) may be such that the at least one transmission device of the one or more transmission devices further includes a model data selection unit that selects the model data to be transmitted with the low-bitrate-encoded images, from a plurality of sets of model data, based on information related to any of the low-bitrate-encoded images transmitted from the transmitter.

5)

A data transmission and reception system is such that at least one transmission device of one or more transmission devices includes a machine learning unit that generates, through machine learning, model data from low-bitrate-encoded data obtained by encoding original data with a low bitrate, the model data for generating improved data close to the original data; at least one of the one or more transmission devices includes a transmitter that transmits the low-bitrate-encoded data along with the model data outside the at least one of the one or more transmission devices; and a reception device includes an improved data generating unit that generates the improved data of the low-bitrate-encoded data, from the low-bitrate-encoded data and the model data received.

6)

An image transmission and reception method includes: generating, through machine learning, model data from low-bitrate-encoded images obtained by encoding original images with a low bitrate by a machine learning unit in at least one of one or more transmission devices, the model data for generating improved images close to the original images; transmitting the low-bitrate-encoded images along with the model data outside the at least one of the one or more transmission devices by a transmitter in at least one of the one or more transmission devices; and generating the improved images of the low-bitrate-encoded images, from the low-bitrate-encoded images and the model data received by an improved image generating unit in a reception device.

7)

The transmission and reception method of 6) may be such that data used in the machine learning further includes meta information of the low-bitrate-encoded image.

8)

The transmission and reception method of 7) may be such that the meta information of the low-bitrate-encoded image is at least one of a coding block quantization parameter (QP), a prediction error coefficient, prediction mode information, or motion vector information of an image encoding technique.

9)

The transmission and reception method of any one of 6) to 8) may be that the at least one of the one or more transmission devices further includes a model data selection unit that selects the model data to be transmitted with the low-bitrate-encoded images, from a plurality of sets of model data, based on information related to the low-bitrate-encoded images transmitted from the transmitter.

10)

A transmission and reception method includes generating, through machine learning, model data from low-bitrate-encoded data obtained by encoding original data with a low bitrate, the model data for generating improved data close to the original data by a machine learning unit in at least one of one or more transmission devices; transmitting the low-bitrate-encoded data along with the model data outside the at least one of the one or more transmission devices by a transmitter in the at least one of the one or more transmission devices; and generating the improved data of the low-bitrate-encoded data from the received low-bitrate-encoded data and the received model data by an improved data generating unit in a reception device.

11)

A computer program is for executing the transmission and reception method of any one of 6) to 10).

12)

An image transmission system includes; a machine learning unit provided in at least one of one or more transmission devices, the machine learning unit generates, through machine learning, model data from low-bitrate-encoded images obtained by encoding original images with a low bitrate, the model data for generating improved images close to the original images; and a transmitter provided in at least one of the one or more transmission devices, the transmitter transmits the low-bitrate-encoded images along with the model data outside the image transmission system.

13)

The image transmission system of 12) may be such that data used in the machine learning is meta information of the low-bitrate-encoded image.

14)

The image transmission system of 13) may be such that the meta information of the low-bitrate-encoded images is at least one of a coding block quantization parameter (QP), a prediction error coefficient, prediction mode information, or motion vector information of an image encoding technique.

15)

The image transmission system of any one of 12) to 14) may further include a model data selection unit that selects the model data to be transmitted with the low-bitrate-encoded images, from a plurality of sets of model data, based on information related to the low-bitrate-encoded images transmitted from the transmitter.

16)

A transmission system includes: a machine learning unit provided in at least one of one or more transmission devices, the machine learning unit that generates, through machine learning, model data from low-bitrate-encoded data obtained by encoding original data with a low bitrate, the model data for generating improved data close to the original data; and a transmitter provided in at least one of the one or more transmission devices, the transmitter that transmits the low-bitrate-encoded data along with the model data outside the at least one of one or more transmission devices.

17)

An image reception device includes: a receiver that receives, from an image transmission system, model data generated through machine learning and low-bitrate-encoded images obtained by encoding original images with a low bitrate, wherein the model data is for generating improved images which are made closer to the original images; and a reception device includes an improved image generating unit that generates the improved images of the low-bitrate-encoded images, from the low-bitrate-encoded images and the model data received.

18)

The image reception device of 17) may be such that data used in the machine learning is meta information of the low-bitrate-encoded image.

19)

The image reception device of 18) may be such that the meta information of the low-bitrate-encoded image is at least one of a coding block quantization parameter (QP), a prediction error coefficient, prediction mode information, or motion vector information of an image encoding technique.

20)

The image reception device of 17) may be such that the model data received by the receiver is selected from a plurality of sets of model data, based on information related to the low-bitrate-encoded images received along with the model data.

21)

A reception device includes: a receiver that receives, from a transmission system, model data generated through machine learning and low-bitrate-encoded data obtained by encoding original data with a low bitrate, wherein the model data is for generating improved data which is made closer to the original images; and an improved data generating unit that generates the improved data of the low-bitrate-encoded data, from the low-bitrate-encoded data and the model data received.

Advantages of the Invention

With the above configuration, the present disclosure can provide an image transmission and reception system, a data transmission and reception system, a transmission and reception method, a computer program, an image transmission system, an image reception device, a transmission system, and a reception device, each of which efficiently implements both efficient compression of transmission band and restoration of images having a resolution similar to that of the original image, while reducing a burden on an operator, in a system that performs transmission and reception of video streaming for viewing video image content, via a transmission path having a limited bandwidth such as the internet communication network.

DESCRIPTION OF EMBODIMENTS

[Configuration Common to Embodiments of the Present Disclosure]

Figure 1:
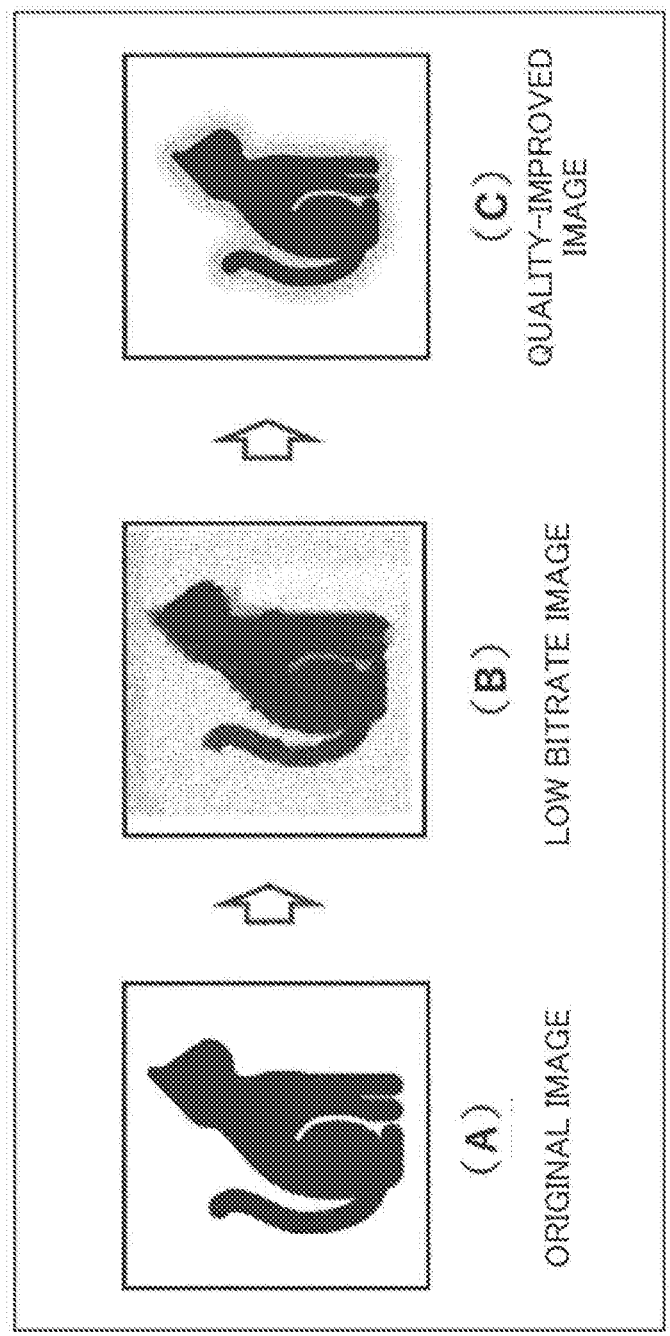
FIG. 1 is a conceptual scheme of image quality improvement processing common to embodiments of the present disclosure.

FIG. 1 is a conceptual scheme of image quality improvement processing common to embodiments of the present disclosure.

In each embodiment of the present disclosure, distribution of content (program), particularly images of video image content, from a video image content distribution server 2-2 is performed as follows. Namely, based on (A) an original image (e.g. an image of a cat) as shown in FIG. 1, (B) a low-bitrate-encoded image (e.g. a low-bitrate-encoded image of the same cat) as shown in FIG. 1 is generated for the purpose of reducing a volume to be transmitted. Then, video image content for transmission composed of the low-bitrate image is distributed to viewer terminals 11, 12, 13.

Each of the viewer terminals 11, 12, 13 having received the distributed content generates (C) an image (e.g. an image of the same cat) visually close to (also referred to as "quality-improved") the original image, as shown in FIG. 1, and integrates each quality-improved image to generate quality-improved video image content for the viewer to see. This is done by configurations and methods of embodiments described hereinafter.

Figure 2:
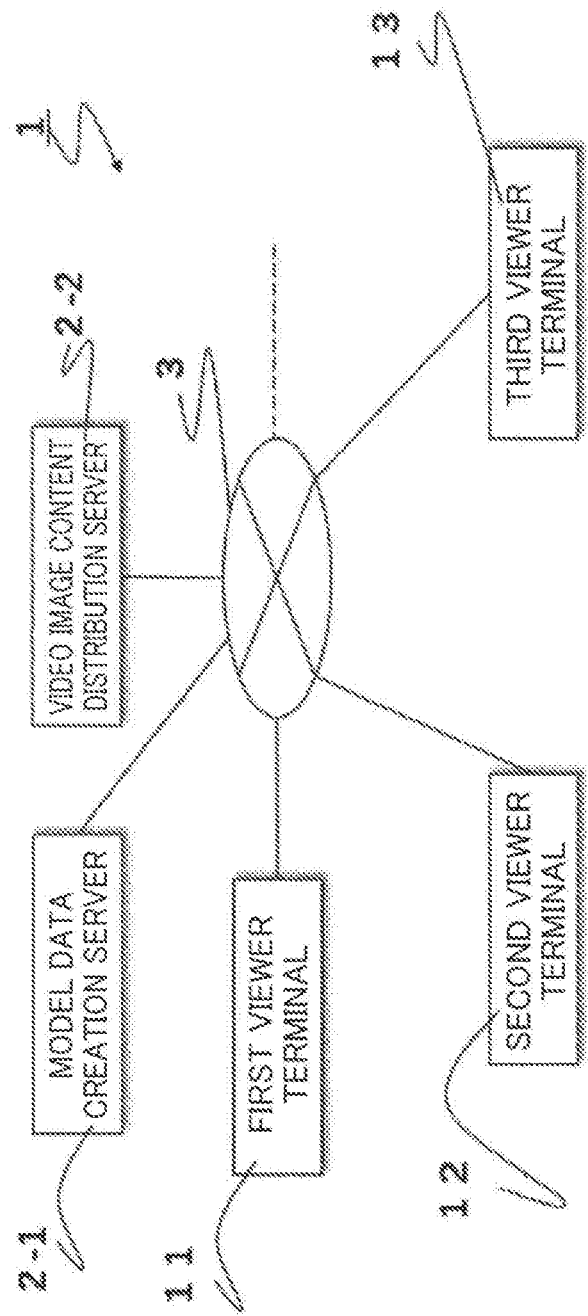
FIG. 2 is a diagram showing an overall configuration of a video image content distribution system according to the present disclosure.

FIG. 2 is a diagram showing an overall configuration of a video image content distribution system according to the present disclosure.

As the configuration common to the embodiments of the present disclosure, a video image content distribution system 1 includes: a model data creation server 2-1 implemented in a form of a server computer or the like, a video image content distribution server 2-2 also implemented in a form of a server computer or the like, and a first viewer terminal 11, a second viewer terminal 12, and a third viewer terminal 13, and the like which are signal-connected with the servers 2-1 and 2-2 via a transmission path 3 such as the internet communication network, as shown in FIG. 2. Each of the viewer terminals is implemented in a form of, for example, a personal computer, a smart phone, or a portable information terminal. The number of viewer terminals is not limited to the above example, in actual implementation. Further, description of each embodiment involves the first viewer terminal 11 as the representative viewer terminal; however, the configuration and the operation are the same in the other viewer terminals.

The "quality improvement" or generating of an image visually close to its original image intended in the present disclosure, when explained qualitatively, is to convert a low-bitrate video image into an image such that a human will perceive as if the image is a decoded high-bitrate video image, whereas configurations of traditional art do no more than simply increasing the number of pixels or removing analog noise. Further, the quality improvement of the present disclosure may include not only an image quality improvement processing in a spatial direction of a still image, but also image quality improvement processing in a temporal direction of a moving image.

First Embodiment: Overview

The following describes a video image content distribution system 1, which is a first embodiment of the present disclosure, with reference to FIG. 1 to FIG. 10. The present disclosure is not limited to the embodiments below, and each embodiment described in the specification of the present application is merely an example of implementing the present invention. Various modifications and combinations with other techniques are possible, and such modifications and combinations are also encompassed within the scope of the present disclosure.

Figure 3:
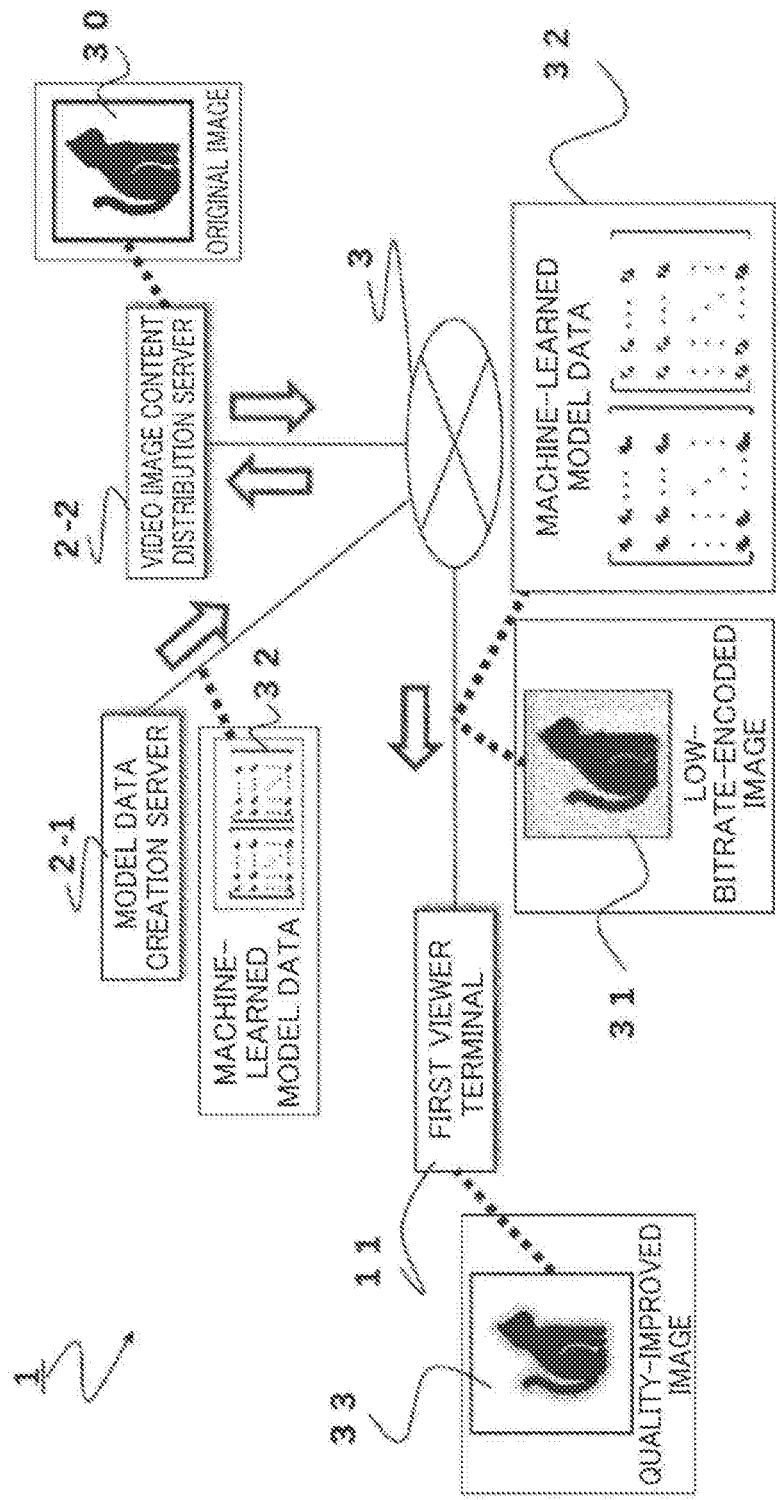
FIG. 3 is a conceptual scheme showing a flow of distribution signals in a first embodiment of the present disclosure.

FIG. 3 is a conceptual scheme showing a flow of distribution signals in a first embodiment of the present disclosure.

In the video image content distribution system 1 of this embodiment having the configuration described above with reference to FIG. 2, the model data creation server 2-1 generates and stores later-described transformation matrices Q and R for the video image content requested to be distributed (transmitted) by the first viewer terminal 11, as illustrated in FIG. 3. The transformation matrices Q and R are machine-learned model data generated through machine learning by using, as input data, a low-bitrate-encoded image and an original image before low-bitrate encoding, the low-bitrate-encoded image and the original image.

Figure 9:
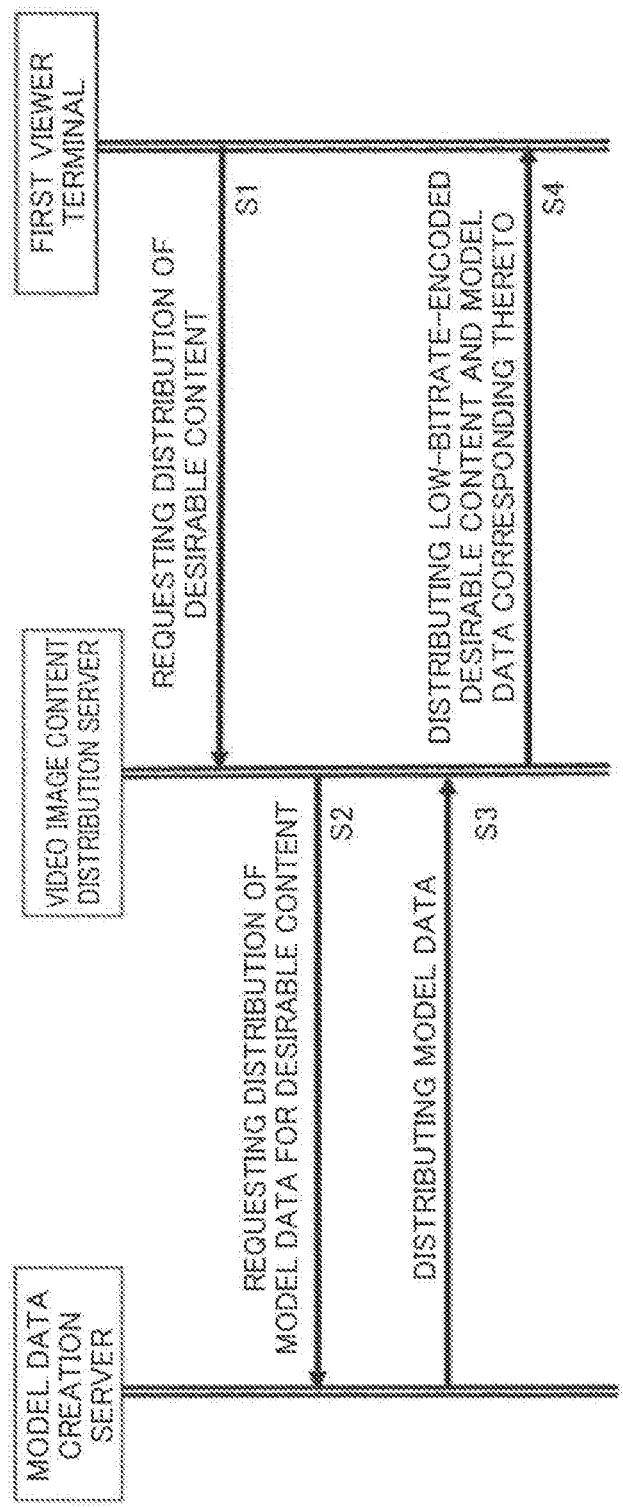
FIG. 9 is a sequence chart of the image quality improvement processing of the first embodiment of the present disclosure.

FIG. 9 is a sequence chart of the image quality improvement processing of the first embodiment of the present disclosure.

When the video image content distribution server 2-2 receives a request for distribution of video image content that the user wishes from the first viewer terminal 11 (step S1 in FIG. 9), the video image content distribution server 2-2 first performs encoding processing to images of original video image content including an original image 30 so as to generate low-bitrate-encoded images 31, and integrates thus generated low-bitrate-encoded images 31 to generate low-bitrate-encoded video image content. Alternatively, low-bitrate encoded content may be generated before such a request for distribution of the content is received.

The video image content distribution server 2-2 requests, to the model data creation server 2-1, distribution of transformation matrices Q and R of, for example, a neural network technology, the transformation matrices Q and R being model data for machine learning, which is suitable for improving the image quality of the distribution-requested video image content through machine learning (step S2 in FIG. 9). Then, along with the conversion matrices Q and R 32 (the machine-learned model data) obtained in response to the request, the video image content distribution server 2-2 transmits the low-bitrate-encoded video image content 31 of the distribution-requested video image content to the first viewer terminal 11 via the transmission path 3 (step S3 and step S4 in FIG. 9).

The first viewer terminal 11 having received the distribution generates, for the low-bitrate-encoded images 31, images 33 visually close to the original images through operations and methods described hereinbelow, using the machine-learned model data 32, and integrates the quality-improved images to generate video image content with a feeling of an improved resolution, and provide the video image content for the viewer to see.

[Obtaining of Model Data Using Machine Learning]

This embodiment adopts a technique of using training data to obtain a most suitable model in machine learning, at a time of obtaining a multidimensional output from a multidimensional input by using a neural network.

It should be noted that, the above-described application of machine learning using a neural network is no more than an example, and the image quality improvement processing may be performed by using other machine learning techniques, and such a variation will also be encompassed within the scope of the present disclosure.

Figure 4:
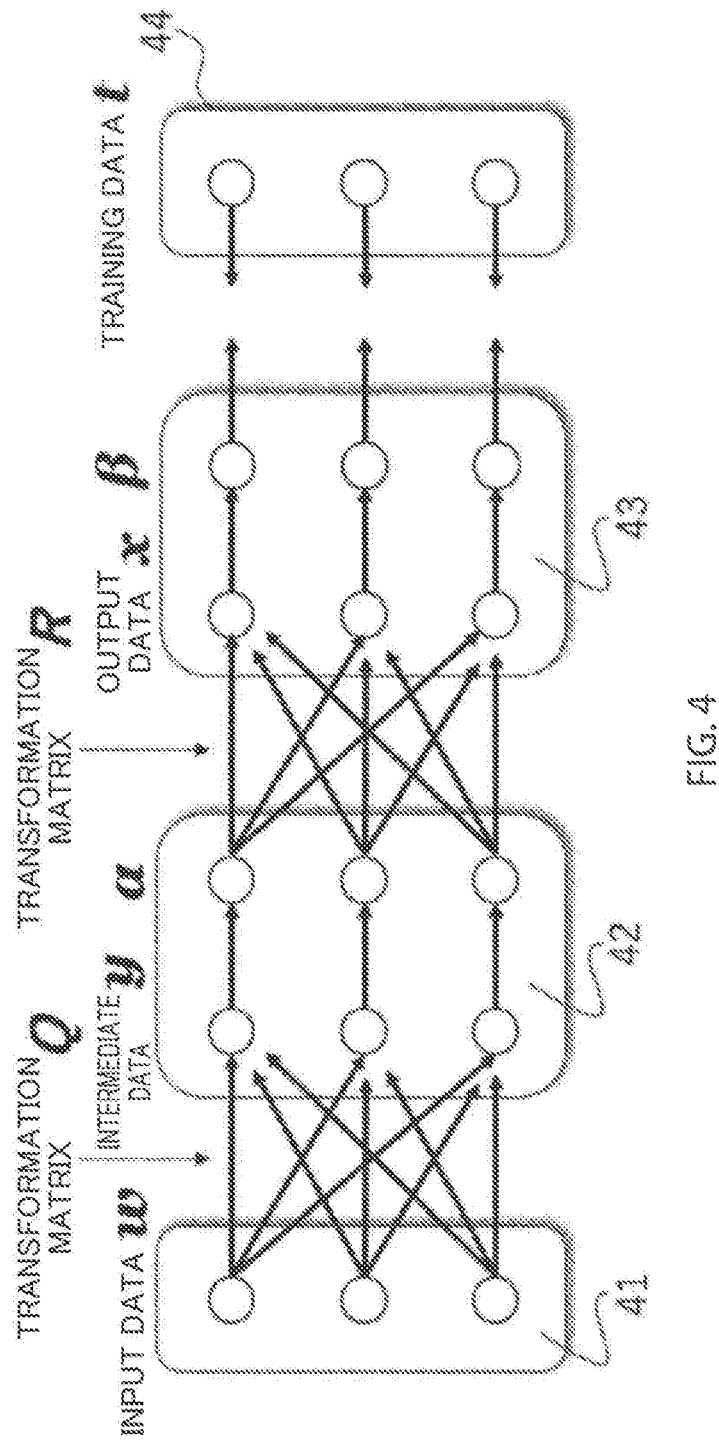
FIG. 4 is a conceptual scheme of a neural network used in the first embodiment of the present disclosure.

FIG. 4 is a conceptual scheme of a neural network used in the first embodiment of the present disclosure.

As shown in FIG. 4, the concept of machine learning for improving the image quality with a neural network according to the first embodiment of the present disclosure is as follows. Namely, input data for the neural network technology includes a plurality of (m-number of) parameters. These parameters are input data parameter 1, input data parameter 2, . . . input data parameter m. The parameters are specific numeric values (luminance, color tone) of a plurality of sample pixels in relation to, for example, a target frame image out of the low-bitrate-encoded images. On the other hand, training data (output data) for the neural network technology includes a plurality of (d-number of) parameters. These parameters are a training data parameter 1, a training data parameter 2, . . . , and a training data parameter m. The parameters are specific numeric values (luminance, color tone) of a plurality of sample pixels in relation to, for example, a target frame image out of original images. Hereinafter, a set of parameters in each set of the input data and the training data (output data) may be referred to as a "parameter vector". Further, the parameters of the input data and the parameters of the output data (training data) may partially or entirely have the same value.

Input data parameter vector w for low-bitrate images as described above (Mathematical (1)) forms the input layer (m-dimensional) 41, and similarly, the output data parameter vector x (Mathematical (2)) which is d-dimensional similarly to a parameter vector β of the above-described training data for the original images forms an output layer (d-dimensional) 43.

[Mathematical 1]

$$w = \begin{bmatrix} w_1 \\ w_2 \\ \vdots \\ w_m \end{bmatrix} \quad (1)$$

[Mathematical 2]

$$x = \begin{bmatrix} x_1 \\ x_2 \\ \vdots \\ x_d \end{bmatrix} \quad (2)$$

A k-dimensional vector y (Mathematical (3), also referred to as intermediate data) forms an intermediate layer (k-dimensional) 42 between the input layer 41 and the output layer 43.

[Mathematical 3]

$$y = \begin{bmatrix} y_1 \\ y_2 \\ \vdots \\ y_k \end{bmatrix} \quad (3)$$

The data of the input layer 41 is converted to the intermediate layer 42 by linear transformation using the transformation matrix Q. The data of the intermediate layer 42 is transformed by linear transformation by using the transformation matrix R and output as data of the output layer 43. The sets of data in each layer are not linked to one another and are independent of each other.

As hereinabove described, two steps of transformations as in Mathematical (4) are performed, instead of direct transformation from the Input data parameter vector w to the output data parameter vector x.

[Mathematical 4]

$$y=Qw, x=Ry \quad (4)$$

In Mathematical (4), Q and R are matrices representing the linear transformations described above. Then, after the linear transformations Q and R, the respective variables are transformed by a nonlinear function. This function is called an activation function, and a logistic sigmoid function a (a) shown in Mathematical (5) is used in this embodiment.

[Mathematical 5]

$$\sigma(a) = \frac{1}{1 + \exp(-a)} \quad (5)$$

When the logistic sigmoid function σ (a) is used, transformation of each set of data described above is expressed in four stages as in Mathematical (6).

[Mathematical 6]

$$y=Qw, a=\sigma(y), x=Ra, \beta=\sigma(x) \quad (6)$$

At the time of learning, training data t (Mathematical (7)) is given in advance. The training data is target data of output variables and is pixel values of an original image. Each parameter of the neural network is determined by performing the following "estimation" so that the output value becomes close to the training data t (represented by the layer (d-dimensional) 44).

[Mathematical 7]

$$t = \begin{bmatrix} t_1 \\ t_2 \\ \vdots \\ t_k \end{bmatrix} \quad (7)$$

When a matrix of k rows and m columns for converting the input data parameter vector w into the variable vector y representing the intermediate layer 42 is represented by Q=[q hj] (where q hj are elements of h rows and j columns), y=Qw, and this is expressed by an element as in Mathematical (8).

[Mathematical 8]

$$\begin{bmatrix} y_1 \\ y_2 \\ \vdots \\ y_k \end{bmatrix} = \begin{bmatrix} q_{11} & q_{12} & \cdots & q_{1m} \\ q_{21} & q_{22} & \cdots & q_{2m} \\ \vdots & \vdots & \ddots & \vdots \\ q_{k1} & q_{k2} & \cdots & q_{km} \end{bmatrix} \begin{bmatrix} w_1 \\ w_2 \\ \vdots \\ w_m \end{bmatrix} \quad (8)$$

Further, the variable vector y transformed in accordance with Mathematical (8) is nonlinearly transformed by the logistic sigmoid function σ (a) described above as in Mathematical (9).

[Mathematical 9]

$$a_k = \sigma(y_h) = \sigma(q_{h1}w_1 + q_{h2}w_2 + \ldots + q_{hm}w_m) \quad (9)$$

$$(h = 1, \ldots k)$$

Similarly, a variable vector α from the intermediate layer 42 is transformed into a variable vector x of the output layer with x=Rα using a matrix R=[r ih] (where r ih are elements of l rows and h columns) of d rows and k columns. This can be expressed by the following Mathematical (10).

[Mathematical 10]

$$\begin{bmatrix} x_1 \\ x_2 \\ \vdots \\ x_d \end{bmatrix} = \begin{bmatrix} r_{11} & r_{12} & \cdots & r_{1k} \\ r_{21} & r_{22} & \cdots & r_{2k} \\ \vdots & \vdots & \ddots & \vdots \\ r_{d1} & r_{d2} & \cdots & r_{dk} \end{bmatrix} \begin{bmatrix} a_1 \\ a_2 \\ \vdots \\ a_k \end{bmatrix} \quad (10)$$

As in the transformation in the intermediate layer 42, the converted variable vector x is further converted by the logistic sigmoid function σ (a) as in Mathematical (11).

[Mathematical 11]

$$\beta_i = \sigma(x_j) = \sigma(r_{i1}\alpha_1 + r_{i2}\alpha_2 + \ldots + r_{ik}\alpha_k) \quad (11)$$

$$(i = 1, \ldots d)$$

Next, a process of estimating two matrices Q and R (learning process) is performed. For this estimation, this embodiment adopts a method called a backpropagation method described below.

Namely, first, an error between the training data t (parameters in the original image) and the output β is calculated. Then, this error is used to obtain the amount of variation in the transformation matrices of the intermediate layer 42 and the output layer 43. Next, the amount of variation in the transformation matrices of the input layer 41 and the intermediate layer 42 is obtained. Estimation of element parameters of each transformation matrix is performed to minimize the squared sum of errors, but since the estimation includes a nonlinear transformation in the process, a stochastic gradient descent method is used. This is a method of changing the element parameters of the matrix by an amount proportional to the gradient of the error so as to reduce the squared sum of the errors for each sample of the learning data.

The elements of the transformation matrices Q and R are estimated through the above processes, thus completing the learning process. When a low-bitrate image to be converted is given, the parameters of the low-bitrate image are each transformed by Mathematical (6) to obtain the output data vector x, thereby obtaining parameters to draw a quality-improved image. The parameters of the low-bitrate image may be pixel values representing the luminance or the color tone of pixels, parameters used in an image encoding technique, or other parameters.

[Configurations of Model Data Creation Server 2-1, Video Image Content Distribution Server 2-2]

Figure 5B:
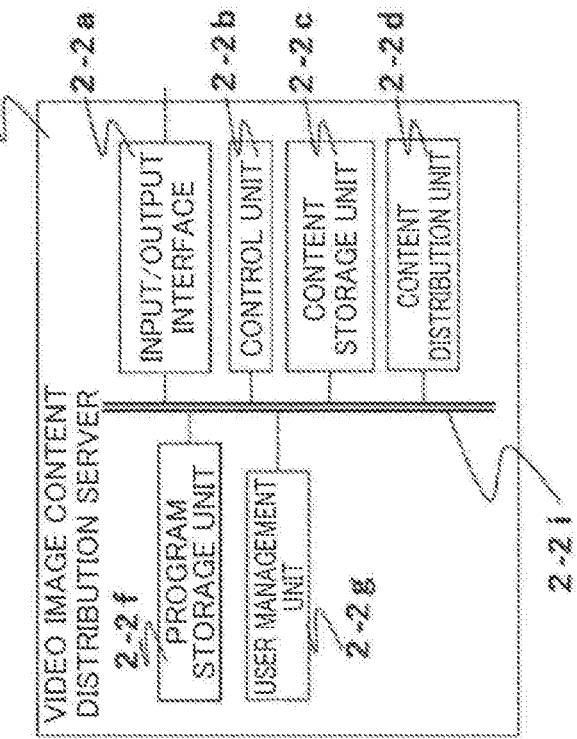
FIGS. 5A and 5B are diagrams showing configurations of a model data creation server and a video image content distribution server common to the embodiments of the present disclosure.
Figure 5A:
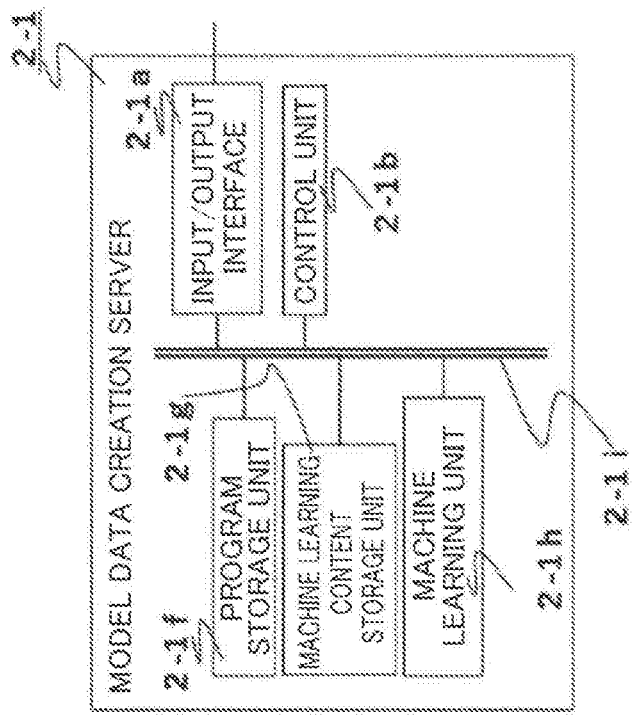

FIGS. 5A and 5B are diagrams showing configurations of the model data creation server and the video image content distribution server common to the embodiments of the present disclosure.

As shown in the configuration diagram of FIG. 5A, the model data creation server 2-1 of the system 1 according to this embodiment is implemented in the form of a server computer, and includes: an input/output interface 2-1a for data communication within and beyond the server; a control unit 2-1b which is a Central Processing Unit (CPU) for various controls of the server 2-1; a program storage unit 2-1f configured to readably store an executable program to be executed by the server 2-1; a machine learning content storage unit 2-1g configured to store input data and training data for use in machine learning based on a neural network, the input data and the training data stored in the form of, for example, low-bitrate-encoded images in video image content of various categories and their original images, or in a different form; a machine learning unit 2-1h configured to perform estimation of transformation matrices Q and R, which is machine learning based on the neural network described above; and a bus 2-1i and the like that performs data communication among components of the server 2-1.

Further, as shown in FIG. 5B, the video image content distribution server 2-2 is implemented in the form of a server computer, and includes the input/output interface 2-2a which controls inputs and outputs of information communicated with outside of the server 2-2, the control unit 2-2b which controls the entire server 2-2, and a content storage unit 2-2C configured to store video image content to be distributed. The content handled by the server 2-2 is not limited to video image content, and may be content of other types such as still image content, audio content, or a combination of various types of content.

Further, for each set of contents, the content storage unit 2-2C stores a "comment" which is viewer-posted text data for the content, together with a reproduction time (information of time measured from the head of the content) of the posting the comment.

Further, the server 2-2 includes: a content distribution unit 2-2d configured to receive a request through communications with the outside, and in response to the request, transmit the video image content to the viewer terminal 11 or the like having sent the request; a program storage unit 2-2f configured to store a computer program to be executed by the server 2-2; a user management unit 2-2g configured to store and manage information related to viewers or viewer terminals (e.g. information regarding whether a viewer terminal having requested distribution of content is a member of a video image distribution site); and a bus 2-2i that enables communications among components within the server 2-2.

As described, the video image content distribution server 2-2 distributes video image content, while the model data creation server 2-1, which is a separate server that performs machine learning for generating model data. Such a configuration, however, is an example, and the present disclosure is not limited to this. That is, to implement the present disclosure, the system 1 may include a single server (or a plurality of servers) which is (are) a transmission device 2-1 or (and) a transmission device 2-2, and the server (or one of the servers) has a configuration to distribute video image content, as well as (while the other server has) a configuration to perform machine learning for generating model data. Further, in the system 1 of the present disclosure, any other server-side configurations may be implemented in a single server (a transmission device) or in at least one of servers (transmission devices), in addition to the configurations of performing the machine learning and distributing video image content. Similarly, configurations of viewer terminal side may be separately provided in a plurality of viewer terminals. That is, a transmission system is composed of a single or a plurality of server(s), that is, a single or a plurality of transmission device(s). Similarly, a reception system is constituted by a single or a plurality of viewer terminal(s), that is, a single or a plurality of reception device(s). The same goes for other embodiments of the present disclosure.

[Configuration of First Viewer Terminal 11]

The following describes a configuration of the first viewer terminal 11. The second viewer terminal 12 and the third viewer terminal 13 also have an identical configuration.

Figure 6:
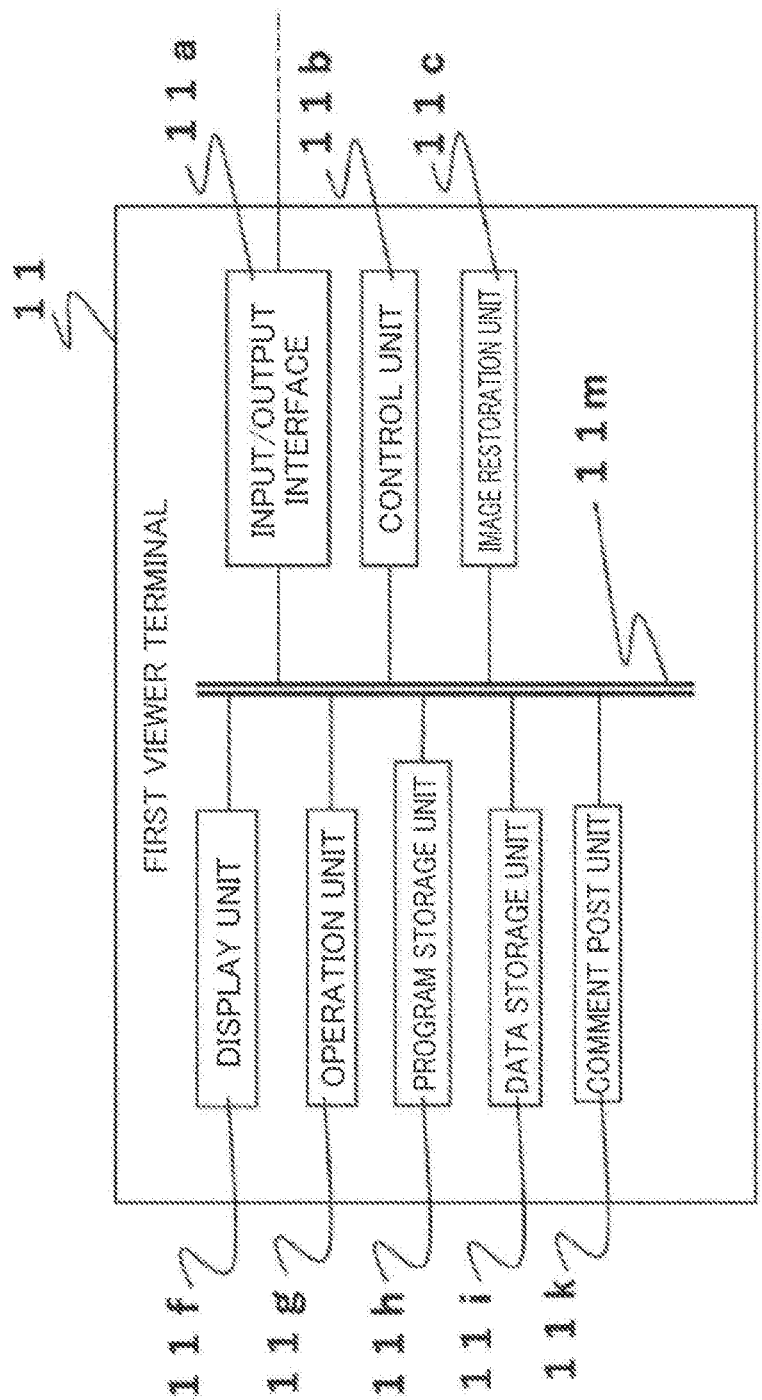
FIG. 6 is a diagram showing a configuration of a first viewer terminal common to the embodiments of the present disclosure.

FIG. 6 is a diagram showing a configuration of a first viewer terminal common to the embodiments of the present disclosure.

As in the configuration shown in FIG. 6, the first viewer terminal 11 is a terminal device to be used by a viewer, such as a personal computer, a smart phone, a portable information terminal, and the like, and includes: an input/output interface controller 11a configured to control input/output interfaces within and beyond the terminal, a control unit 11b configured to control the entire terminal, an image restoration unit 11c configured to restore a quality-improved image from a low-bitrate-encoded image by using a machine-learned model; a display unit 11f including a liquid crystal screen and a control unit thereof, which displays video image content and an operation screen and the like of a video image site; an operation unit 11g implemented by a keyboard, a mouse and the like, which is used by the viewer to operate the viewer terminal 11; a program storage unit 11h configured to store a computer program to be executed in the viewer terminal 11; a data storage unit 11i configured to store video image content with low-bitrate images received from the server 2-2 or video image content with images which are restored by the image restoration unit and have an improved resolution; a comment post unit 11k that allows posting of comments to the video image content distribution server 2-2 as described later; and a bus 11m that enables communications among components within the terminal 11.

Figure 7:
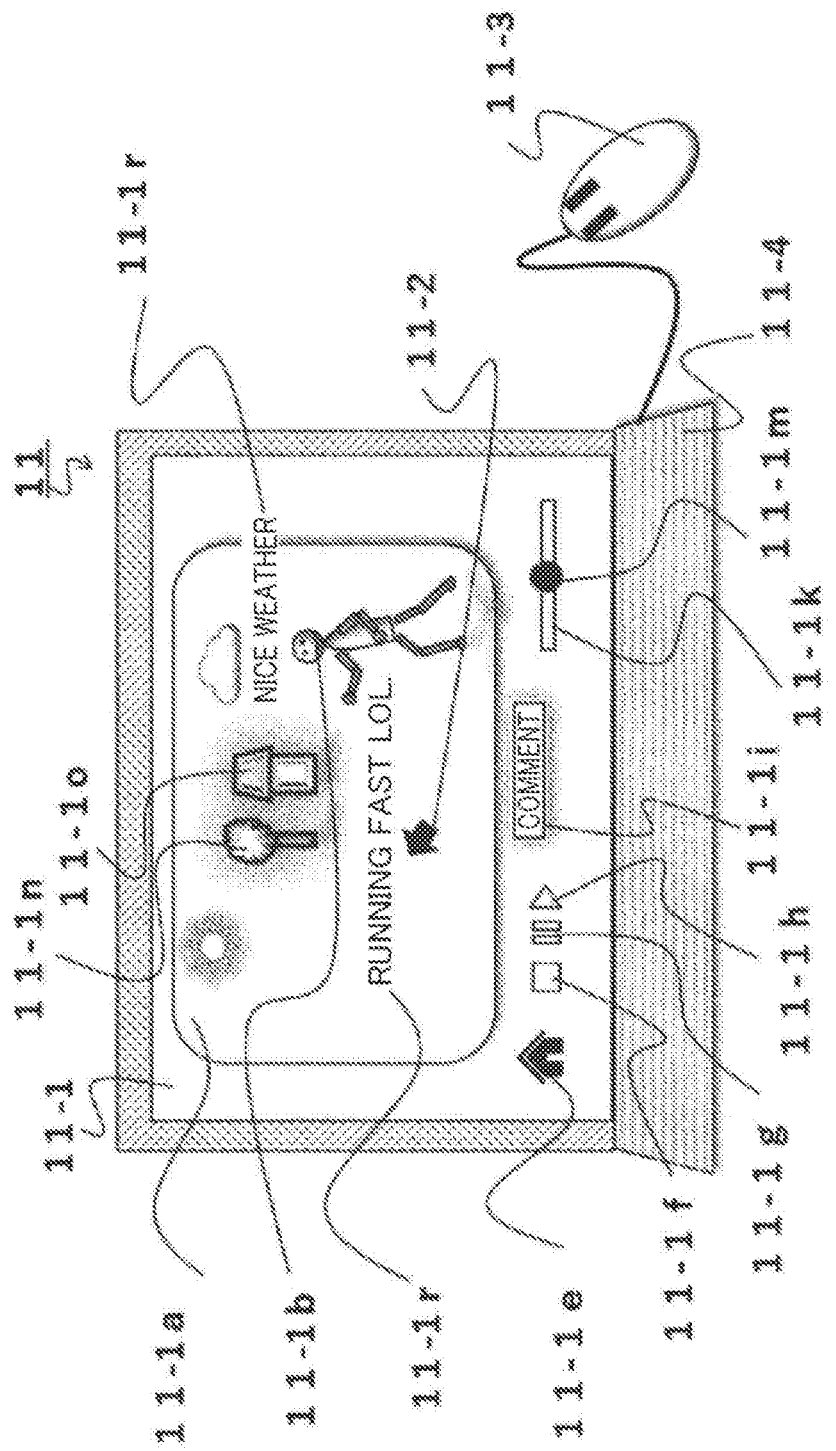
FIG. 7 is a schematic external view of the first viewer terminal common to the embodiments of the present disclosure.
Figure 8:
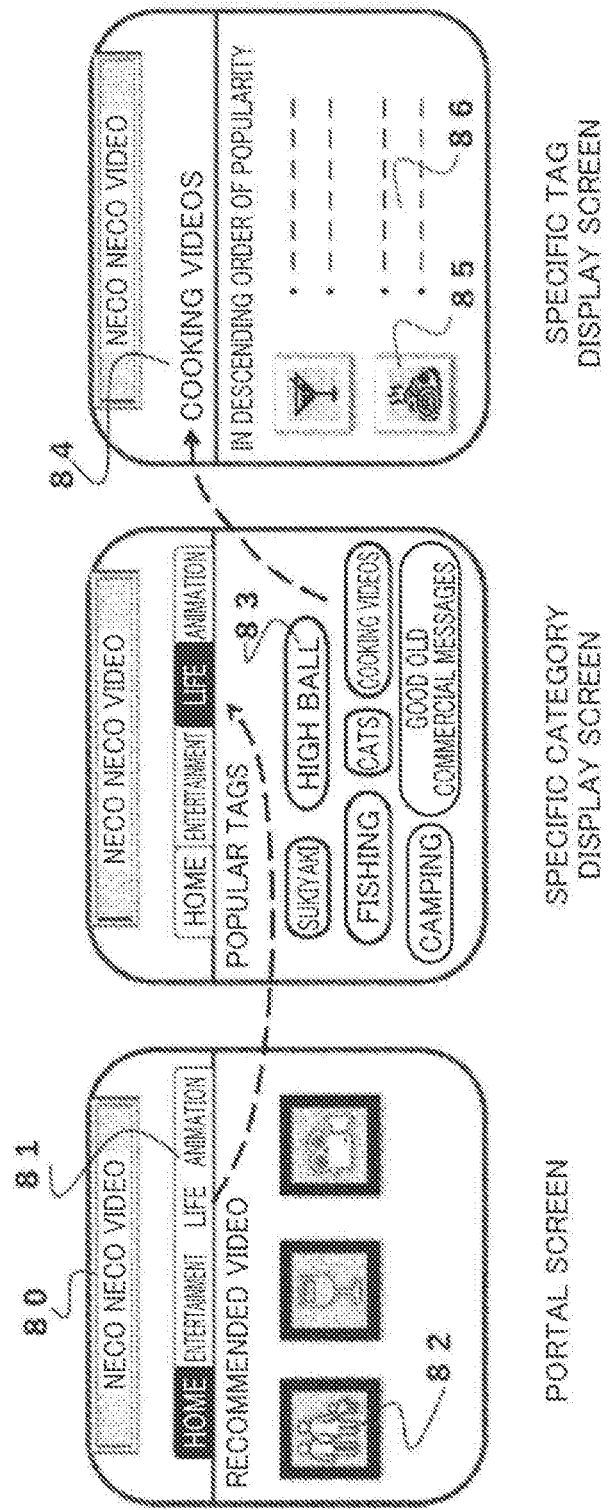
FIGS. 8A-8C are screen transition diagrams of a video image distribution site common to the embodiments of the present disclosure.

FIG. 7 is a schematic external view of the first viewer terminal common to the embodiments of the present disclosure.

FIG. 7 is schematically illustrating the exterior of the first viewer terminal 11. The first viewer terminal 11 has a display panel 11-1, a mouse cursor 11-2 displayed within the display panel 11-1, a mouse 11-3, and a keyboard 11-4.

FIG. 7 illustrates a situation where a set of video image content is reproduced and displayed, and the display panel 11-1 displays a video image display screen 11-1a in which a person 11-1b, a tree 11-1n, and a house 11-1o are displayed as the content of the video image content.

The display panel 11-1 further displays a comment "Nice weather" 11-1r, and a comment "Running fast lol" 11-1r. These comments 11-1r are not created by a contributor (or also referred to as "distributor", for the sake of convenience) who created and uploaded the video image content to the video image content distribution server 2-2, but are text information created and posted to the video image content distribution server 2-2 at any timing while the video image content is reproduced, by the viewer of the first viewer terminal 11 or another viewer having viewed the video image content. To allow the viewers to clearly understand that the comments are not the original video image content, the comments are displayed so as to partially stick out to the outside of the video image display screen 11-1a.

Similarly, the display panel 11-1 displays, as the screen of the video image distribution site displayed by connecting to and communicating with the video image content distribution server 2-2, a home button 11-1e for switching display to a portal screen (entrance screen) of the video image content distribution site, a stop button 11-1f for ending reproduction of the video image, a pause button 11-1g for temporarily pausing reproduction of the video image, a play button 11-1h for resuming reproduction of the paused video image content, a comment post button 11-1i for posting a comment, and a seek bar 11-1k and a seek button 11-1m for displaying the reproduction time in a form of a relative position from the start point to the end point.

It has already been described that the video image distribution site provided by the video image content distribution server 2-2 allows viewers to post comments 11-1r with respect to video image content. The comment posted is displayed at a reproduction time which is the same as the post time of the comment in the reproduction time (e.g. at 1 min. if the comment is posted at 1 min. in a 3 min.-long content), when the same content is reproduced by any other viewer. Therefore, when a comment is posted, text information which is the actual content of the comment along with post time information of posting the comment are transmitted from the viewer terminal to the server 2-2 and stored in the server 2-2. When another viewer sends, to the server 2-2, a transmission request signal for reproduction of that dynamic image content for viewing, the server 2-2 transmits comment information with its post-time information along with a requested program content. Therefore, a viewer of each viewer terminal is able to see the comment at the same reproduction time as the post time of the comment by the contributor, with the same screen on the background.

FIGS. 8A-8C are screen transition diagrams of a video image distribution site common to the embodiments of the present disclosure.

FIGS. 8A-8C are intended to explain the original use of a later-described "tag" serving as an item for searching content, by illustrating screen transition of the video image distribution site provided by the video image content distribution server 2-2. The tag will be described in relation to the screen display, as it relates to the user interface of the content distribution site screen.

On a portal screen of FIG. 8A which is displayed first upon establishing connection with the video image distribution site, a site name 80 "Neco Neco Video", and tabs 81 including a "Home" tab (the portal screen), and tabs for categories (category tags) of "Entertainment", "Life", "Animation" are displayed. On the lower side of the portal screen, a plurality of thumbnail images 82 are displayed. When the viewer selects and clicks any desirable one of the thumbnail images 82, reproduction of the associated program content (show content) is started.

FIG. 8B shows a display screen when the viewer clicked the "Life" category displayed on the screen of FIG. 8A, and shows viewer-selectable tags 83 belonging to the "Life" category ("Sukiyaki", "High Ball", "Fishing", "Cats", "Cooking Videos", "Camping", "Good Old Commercial Messages").

FIG. 8C shows a screen displayed when the "Cooking Videos" tag is selected in the screen of FIG. 8B. The selected tag name "Cooking Videos" is shown in the upper portion of the screen, and thumbnail images 85 of a plurality of sets of video image content with the "Cooking Videos" tag are displayed along with captions (descriptions) 86 of the sets of the video image content. Since the viewer is able to select and click a thumbnail image 85 of video image content he or she wishes to view, the tags for guiding the viewer selection are extremely useful. In addition, although illustration is omitted, it is possible to search any given word on a separate keyword selection screen and display a list of tag names corresponding to the searching word.

[Process of Generating Quality Improved Images, Using Machine-Learned Model]

FIG. 9 is a sequence chart of the image quality improvement processing of the first embodiment of the present disclosure.

Figure 10:
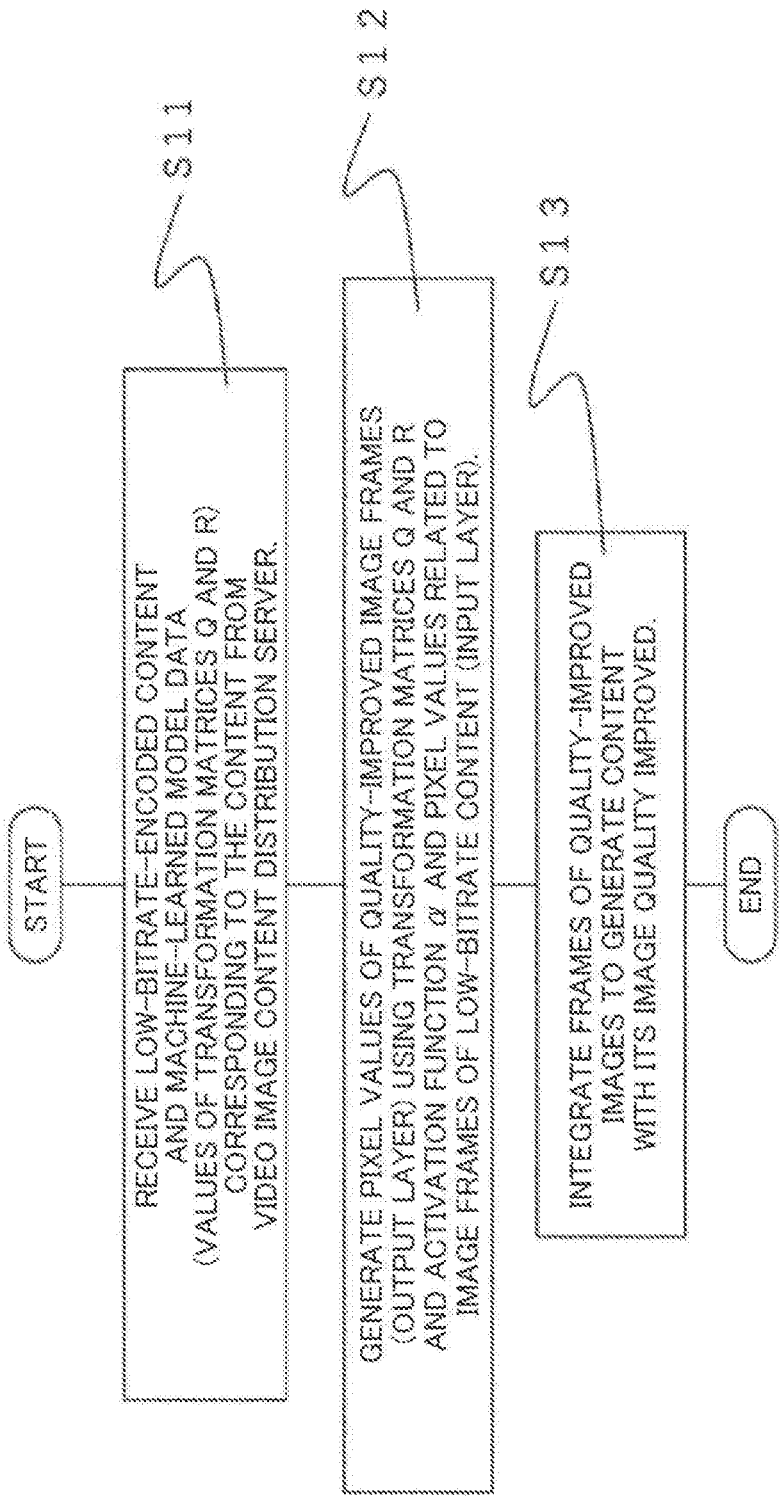
FIG. 10 is a flowchart of the image quality improvement processing for images executed by the first viewer terminal of the first embodiment of the present disclosure.

FIG. 10 is a flowchart of image quality improvement processing executed by the first viewer terminal in the first embodiment of the present disclosure.

Once again, with reference to the sequence chart of FIG. 9 and the flowchart of FIG. 10, a process of obtaining a quality-improved image from a low-bitrate encoded image, by using transformation matrices Q and R (machine-learned model data 32 described hereinabove) is described. It should be noted that the first viewer terminal 11 in the above description may be referred as to viewer terminal 11.

First, the video image content distribution server 2-2 stores a plurality of sets of video image content composed of original images or video image content with the original images encoded with a low bitrate. The viewer determines which set of content to view, by referring to images and other information presented on the content distribution site described above, and for example, clicks a thumbnail button of the content displayed on the display screen of the viewer terminal 11. Then, from the viewer terminal 11, a distribution request signal for that set of content is transmitted to the video image content distribution server 2-2, and the video image content distribution server 2-2 receive the distribution request signal (Step S1 of FIG. 9).

Meanwhile, the model data creation server 2-1 stores the above-described transformation matrices Q and R, which are machine-learned model data 32 for the distribution-instructed content in the video image content distribution server 2-2.

The model data corresponding to content may be obtained as follows. For example, for video image content related to a "cat", there is "Animals" as a category of video image content. Using the original images belonging to this "Animal" category as training data and low-bitrate-encoded images of the original images as input images, transformation matrices Q and R are estimated through machine learning. Then, the model data creation server 2-1 or the video image content distribution server 2-2 may, upon given information related to the video image content for which the user has sent a distribution request through the viewer terminal 11, select a machine-learned model data suitable for improving the images of the video image content out of a plurality of sets of model data prepared, and distribute the selected set of model data to the viewer terminal 11 via the video image content distribution server 2-2 (Steps S2 and S3 of FIG. 9).

Alternatively, the model data may be obtained through machine learning directly using the images in the video image content to be distributed. That is, in machine learning using a neural network, values of pixels (luminance, color tone) in the low-bitrate-encoded images and their original images of the video image content to be transmitted to the viewer terminal 11 may be used as the input data and training data. This configuration makes the model data 32 closer to the video image content to be transmitted, and achieves a better quality of images whose quality has been improved by using that machine-learned model data 32. However, such a configuration requires machine learning to be implemented to prepare model data for each set of content likely to be distributed to the viewer terminal 11.

In view of the above points, the model data may be generated through the method of creating model data through machine learning using images belonging to a category or a related field to which the video image content pertains, instead of using the images of the video image content to be distributed. As hereinabove described, for video image content of a "cat", the model data may be generated through machine learning using images of video image content belonging to the "Animal" category. This configuration reduces the frequency of performing machine learning, and allows a distributable content title to be added freely and quickly.

While there is a method of using model data obtained through machine learning using images belonging to the "Animal" category, for video image content related to a "cat", there is a possibility that it is an operating human who has to determine whether the video image content related to the "cat" belongs to the "Animal" category. Further, to obtain images closer to the content to be distributed, that is, to the original images as a result of the processing for improving the image quality, sets of model data may be sorted by the types of content to be distributed, what is in the content, titles, creators, genres, and the like, and a suitable type of model data may be transmitted along with the video image content. Alternatively, a suitable model data may be selected from a combination of "types of content to be distributed, what is in the video image content, titles, creators, genres" and the like as well as with other items.

In this regard, for example, the following items are closely related to what is in the content, and allow suitable sorting of characteristics of images in the video image content. Therefore, it is also effective to automatically prepare and sort sets of model data by these items, and distribute a corresponding set of model data along with the low-bitrate encoded content of the distribution-requested video image content.

To this end, the above-described model data creation server 2-1 or the video image content distribution server 2-2 may be configured to select a most suitable set of model data from a plurality of pieces of model data, for improving the quality of the distribution-requested video image content requested. As to the operation of making such a selection, if the video image content to be distributed contains, for example, any of the following items, a set of model data suitable for image quality improvement processing may be automatically selected based on the item.

Comment information posted by a viewer having viewed the video image content

Text information describing the video image content

Information regarding the creator of the video image content

Information regarding the name of the video image content or a series name

Information regarding the distributor who distributes the video image content

Another example of items closely related to the content of the video image content is "tag" information.

The "tags" are a search keyword added to each set of video image content, which indicates the content of the video image, and up to 10 tags may be added to a single set of video image content. The tags allow the viewer to easily find a desirable video image or a video image similar to a certain video image.

Tags may be freely added not only by a video image contributor who posted video image content to the server 2, but also by a viewer (which may also be referred to as browsing person) of the video image content. The tags are originally used as a search function, but there are many cases of tagging in relation to the content of a video image and cases of tagging unique to a video image distribution site. In some cases, tags play a role of letting viewers know the highlights of a video image, rather than categorizing video images for search, and there are also cases of using tags for communications among viewers. Tags are sometimes voluntarily invented by browsing people viewing video images of the same material (e.g. myriad subgenres belonging to popular genres such as "I sang it" and "The Idolmaster") or video images by the same contributor. These tags address the need for more in-depth search. (Partly cited from Wikipedia "Nico Nico Douga" https://ja.wikipedia.org/wiki/%E3%83%8B%E3%82%B3%E3%83%8B%E3%82%B3-%E5%8B%95%E7%94% BB)

The applicant of the present application manages a video image distribution site "Nico Nico Douga" https://www.nicovideo.jp/video_top?ref=nicotop_video.

Examples of tags actually used in this "Nico Nico Douga" site include the following tags.

A "category" (also referred to as "category tags") of "Entertainment/Music" which is a high-level classification of tags includes, for example, the following tags: "Voiceroid Theater", "Original Music", "Virtual YouTuber", "Idle Club", "Niji Sanji", "Full Anime Songs", "Background Music for Work" "Fate/MMD", "MMD Touken Ranbu", "Nico Slot", "About SCP", "Pachi-Slot", "SCP", "Bokaroid Karaoke DB", "Slowly Talked Lectures", "Voice Actor Live", "R.A.B", "Pachinko", "Background Music for Work without Animation Taste", "Singing Voiceroid", "Vocaloid", "Legends", "Cosplay Dancing", "Nico-Pachi", "Vocaloid Hall of Fame", "Uclick-Television", "Courage Testing at Minecraft", "Slowly Told Ghost Stories", "Halo Pro", "Western Popular Music Collection", "Let's Write Stories", "That Song I was Looking for", "Western Music".

Similarly, a category of "Life in general/Sports" includes, for example, the following tags: "US-Japan Baseball Games", "Norwich", "RTA (Real Mountain Climbing)", "Slowly Talked Lectures", "Onboard Voiceroid", "WWE", "Asian Short-Clawed Otter", "Figure Skating", "Traffic In The World", "Motorcycle", "Drive Recorder", "Friends of Different Species", "Failed Companies", "Easy Chatting", "Voiceroid Explained", "Professional Baseball", "Cutest Firballs", "Lost Wildness", "Voiceroid With A Drink", "Person with a Highball", "World Freaks And Incredible People", "Slowly Talked Lecture Videos", "Collection of Retired Baseball Players in Games during Active Period", "Shiba Dogs", "BBQ". "Hawkish Tribes", "F1", "Nico Nico Overseas Tour", "Nuco Nuco Videos", "Wildness Unleashed", "Outdoor Cooking", "Ramen", "Military", "Home Run Collection", "Road Race", "Good Old Commercial Messages", "Dogs", "Seals". "Toast", "Live on Onboard Cameras", "Baseball", "Yokohama Dena Baystars", "Cats", "Screaming Beavers", "Dogs and Cats".

Similarly, a category of "Science and Technology" includes, for example, the following tags: "Atheroma", "Aircraft Accident", "Guns", "Documentary", "Revolvers", "Military", "Amazing Universe", "Series: Rotating Pottery Wheels", "Hydrogen Sound". "Pistols", "Figures", "Rare Weapons", "Series-Let's Fly on Strange Airplanes", "Strange Train Variant Series", "Men in Napoli", "Plastic Models", "Japanese Katana Swords", "Space". "Shocking Footage", "Military Training: Fail Collection", "Circumferential Ratio", "Nostalgic PC", "Mini 4wds", "Nico Nico Weapon Development Bureau", "JAXA", "Subaru", "Nico Nico Fantasy Science Club", "Size Comparison Series", "Black Holes", "Vehicle Approach Notification Device Series", "F-22", "Global Traffic Conditions", "Ornithopter", "Traps for Scientific People", "Mathematics".

As a result, the following outstanding effects are brought about.

First, these tags are added by contributors or viewers of content. Therefore, there is no need for the operator or the administrator of the system 1 to add these tags. Further, since tags are added by the contributor or the viewer who knows what's in the content, the tags are added more accurately.

Further, unlike the categories, the tags described above are subdivisions of the categories and are added by contributors and viewers who are familiar with the already-existing tags. Therefore, sets of video image content with the same tags are expected to be close to one another, and an accurate learning process of the machine learning is possible.

As described, the transformation matrices Q and R which are each model data 32 are obtained by estimation through machine learning using a neural network, with low-bitrate-encoded images of images contained in a set of video image content as the input data, and their corresponding original images as the training data.

The video image content distribution server 2-2 transmits, to the viewer terminal 11, a set of distribution-requested content data, which is composed of low-bitrate-encoded images, and model data 32 suitable for the content data (Step 4).

The viewer terminal 11 receives the model data 32 and the low-bitrate encoded content (step S11), and then obtains, for each frame of low-bitrate-encoded images composing the content data, a frame of quality-improved images based on pixel values in the form of output data of the neural network according to the above-mentioned Mathematical (6) (step S12). Then, the frames of quality-improved images thus obtained are integrated on the time basis so as to obtain content data with its image quality improved (step S13).

Second Embodiment

A second embodiment of the present disclosure may be configured in the similar manner as the first embodiment, except for the following configuration. Namely, data used in the machine learning may include the following meta information of low-bitrate-encoded video image content whose image quality is to be improved, the meta information being at least any of the following items of an image encoding technique, apart from or in addition to the above-described pixel values (luminance, color tone) of the frames of low-bitrate-encoded images and their original images.

Coding block quantization parameter
Prediction error coefficient
Prediction mode information
Motion vector information With this configuration, improvement in the accuracy of estimation in the machine learning is expected.

Third Embodiment—Application to Various Data Format

Each of the above-described embodiments described how the present disclosure is implemented, mainly in relation to distribution of video image content. However, application of the present disclosure is not limited to video image content, and may be implemented in relation to various data types such as still image data, audio data, and the like. In a data transmission and reception system of the present embodiment configured as described in the foregoing first and second embodiments, at least one of one or more transmission devices includes a machine learning unit configured to generate, through machine learning, model data from low-bitrate-encoded data obtained by encoding original data with a low bitrate, the model data for generating improved data close to the original data. Further, at least one of the one or more transmission devices includes a transmitter configured to transmit the low-bitrate-encoded data along with the model data outside the at least one of the one or more transmission devices. Further, a reception device includes an improved data generating unit configured to generate the improved data of the low-bitrate-encoded data, from the low-bitrate-encoded data and the model data received. Further, the data transmission and reception system may include the configurations identical to those in the above-described video image content distribution system 1 of each embodiment, except in that the configurations support a data format other than the video image content or various data formats in general.

As in the technical problems in the foregoing video image distribution system, it is required to reduce the load to the transmission path when transmitting various types of data, and a high quality of reproduction is required when a receiver terminal reproduces the data received. Advantageous effects brought about by this embodiment are the same as those brought about by the foregoing embodiments.

Fourth Embodiment—Direct Distribution of Model Data to Client Terminal

Next, a fourth embodiment will be described in which details are different from those of the embodiments described above. Note that the following characteristic configurations of the fourth embodiment can be combined with the configurations of the above-described embodiments, and such a combination of configurations are also encompassed in the present disclosure.

Each of the above embodiments of the present disclosure is described as follows. When a request for distribution of video image content or other data is sent from a client terminal (corresponding to the first viewer terminal 11) to a server (corresponding to the video image content distribution server 2-2), machine-learned model data suitable for improving the video image content or the data is selected and sent from another server (corresponding to the model data creation server 2-1) to the server (corresponding to the video image content distribution server 2-2). The server (corresponding to the video image content distribution server 2-2) distributes, to the client terminal (corresponding to the first viewer terminal 11), low-bitrate encoded data corresponding to the distribution-requested video image content or data, and the machine-learned model data selected. As a result, the client terminal is able to obtain, from the low-bitrate-encoded data and the model data received, improved data such as video image content with improved image quality.

When implementing the present disclosure, it is not essential nor is it a must to first transmit the machine-learned model data from the other server (corresponding to the model data creation server 2-1) to the server (corresponding to the video image content distribution server 2-2), and then from the server (corresponding to the video image content distribution server 2-2) to the client terminal (corresponding to the first viewer terminal 11). Instead of this, the machine-learned model data may be directly transmitted from the other server (corresponding to the model data creation server 2-1) to the client terminal (corresponding to the first viewer terminal 11).

When the present disclosure is implemented in such a configuration, the server corresponding to the model data creation server 2-1 obtains information regarding video image content or data for which distribution request is sent from the client terminal corresponding to the first viewer terminal 11 to the server corresponding to the video image content distribution server 2-2, selects a machine-learned model data suitable for improving the video image content or the data, and directly distributes the machine-learned model data to the client terminal corresponding to the first viewer terminal 11, in synch with, or before or after, a timing of distributing low-bitrate-encoded data (exemplified with the video image content) by the server corresponding to the video image content distribution server 2-2.

That is, when the configuration of this fourth embodiment is implemented in a field of video image content distribution, a transmission system having one or more transmission devices, that is, one or more servers, includes: a unit configured to transmit low-bitrate-encoded video image content, a unit configured to transmit machine-learned model data suitable for improving the low-bitrate-encoded video image content for generating video image content with an improved image quality. Meanwhile, a receiver terminal includes a unit configured to generate the video image content with an improved image quality, from the received low-bitrate-encoded video image content and the received machine-learned model data.

Further, when the configuration of this fourth embodiment is implemented in a field of distributing not only video image content, but also data in general, a transmission system having one or more transmission devices each serving as a server, includes: a unit configured to transmit low-bitrate-encoded data, a unit configured to transmit machine-learned model data suitable for improving the low-bitrate-encoded data for generating data closer to the original data. Meanwhile, a receiver terminal includes a unit configured to generate the data improved to be closer to the original data, from the low-bitrate-encoded video data and the machine-learned model data received.

Advantages of the Invention

The present disclosure can provide an image transmission and reception system, a data transmission and reception system, a transmission and reception method, a computer program, an image transmission system, an image reception device, a transmission system, and a reception device, each of which efficiently implements both efficient compression of transmission band and restoration of images having a resolution similar to that of the original image, while reducing a burden on an operator, in a system configured to perform transmission and reception of video streaming for viewing video image content, via a transmission path having a limited bandwidth such as the internet communication network.

DESCRIPTION OF REFERENCE CHARACTERS

1 Video Image Content Distribution System
2-1 Model Data Creation Server
2-2 Video Image Content Distribution Server
11 First Viewer Terminal
30 Original Image
31 Low-Bitrate-Encoded Image
32 Machine-Learned Model Data
33 Quality-improved Image

The invention claimed is:

1. An image transmission and reception system, comprising:
one or more transmission devices; and
a reception device, wherein
at least one transmission device of the one or more transmission devices includes:
one or more processors, at least one processor of the one or more processors configured to generate model data through machine learning, the model data for generating improved images from low-bitrate-encoded images obtained by encoding original images with a low bitrate; and
a transmitter configured to transmit the low-bitrate-encoded images along with the model data outside the at least one transmission device,
the reception device configured to:
receive the low-bitrate-encoded images and the model data from the transmitter; and
generate the improved images of the low-bitrate-encoded images from the received low-bitrate-encoded images and the received model data, and
at least one processor of the one or more processors is configured to select the model data to be transmitted with the low-bitrate-encoded images, from a plurality of sets of model data, based on information related to distribution-requested content including at least one of comment information posted by a viewer of the distribution-requested content and tag information added by a viewer of the distribution-requested content.

2. The image transmission and reception system of claim 1, wherein
data used in the machine learning further includes meta information of the low-bitrate-encoded images.

3. The image transmission and reception system of claim 2, wherein
the meta information of the low-bitrate-encoded images is at least one of a coding block quantization parameter (QP), a prediction error coefficient, prediction mode information, or motion vector information of an image encoding technique.

4. A data transmission and reception system, comprising:
one or more transmission devices; and
a reception device, wherein
at least one transmission device of the one or more transmission devices includes:
one or more processors, at least one processor of the one or more processors configured to generate model data through machine learning, the model data for generating improved data from low-bitrate-encoded data obtained by encoding original data with a low bitrate; and
a transmitter configured to transmit the low-bitrate-encoded data along with the model data outside the at least one transmission device of the one or more transmission devices,
the reception device configured to:
receive the low-bitrate-encoded data and the model data from the transmitter; and
generate the improved data from the received low-bitrate-encoded data and the received model data, and
at least one processor of the one or more processors is configured to select the model data to be transmitted with the low-bitrate-encoded data, from a plurality of sets of model data, based on information related to distribution-requested content including at least one of comment information posted by a viewer of the distribution-requested content and tag information added by a viewer of the distribution-requested content.

5. An image transmission and reception method, comprising:
generating model data through machine learning by at least one processor of one or more processors in at least one transmission device of one or more transmission devices, the model data for generating improved images from low-bitrate-encoded images obtained by encoding original images with a low bitrate;
transmitting the low-bitrate-encoded images along with the model data outside the at least one transmission device of the one or more transmission devices by a transmitter in the at least one transmission device of the one or more transmission devices;
receiving the low-bitrate-encoded images and the model data from the transmitter by a reception device; and
generating the improved images of the low-bitrate-encoded images from the received low-bitrate-encoded images and the received model data by the reception device, wherein
the method further comprises selecting the model data to be transmitted with the low-bitrate-encoded images, from a plurality of sets of model data, based on information related to distribution-requested content, by at least one processor of the one or more processors, and
the information related to the distribution-requested content include at least one of comment information posted by a viewer of the distribution-requested content and tag information added by a viewer of the distribution-requested content.

6. The transmission and reception method of claim 5, wherein data used in the machine learning further includes meta information of the low-bitrate-encoded image.

7. The transmission and reception method of claim 6, wherein the meta information of the low-bitrate-encoded image is at least one of a coding block quantization parameter (QP), a prediction error coefficient, prediction mode information, or motion vector information of an image encoding technique.

8. A transmission and reception method, comprising:
generating model data through machine learning by at least one processor of one or more processors in at least one transmission device of one or more transmission devices, the model data for generating improved data from low-bitrate-encoded data obtained by encoding original data with a low bitrate;
transmitting the low-bitrate-encoded data along with the model data outside the at least one transmission device of the one or more transmission devices by a transmitter in the at least one transmission device of the one or more transmission devices;
receiving the low-bitrate-encoded data and the model data from the transmitter by a reception device; and
generating the improved data of the low-bitrate-encoded data from the received low-bitrate-encoded data and the received model data by the reception device, wherein
the method further comprises selecting the model data to be transmitted with the low-bitrate-encoded data, from a plurality of sets of model data, based on information related to distribution-requested content, by at least one processor of the one or more processors, and
the information related to the distribution-requested content include at least one of comment information posted by a viewer of the distribution-requested content and tag information added by a viewer of the distribution-requested content.

9. A non-transitory computer-readable recording medium, storing a computer program that causes a processor to execute the transmission and reception method of claim 5.

10. An image transmission system, comprising one or more transmission devices, at least one transmission device of the one or more transmission devices comprising:
one or more processors, at least one processor of the one or more processors configured to generate model data through machine learning, the model data for generating improved images from low-bitrate-encoded images obtained by encoding original images with a low bitrate; and
a transmitter configured to transmit the low-bitrate-encoded images along with the model data outside the at least one transmission device of the one or more transmission devices, wherein
at least one processor of the one or more processors is configured to select the model data to be transmitted with the low-bitrate-encoded images, from a plurality of sets of model data, based on information related to distribution-requested content including at least one of comment information posted by a viewer of the distribution-requested content and tag information added by a viewer of the distribution-requested content.

11. The image transmission system of claim 10, wherein data used in the machine learning is meta information of the low-bitrate-encoded image.

12. The image transmission system of claim 11, wherein the meta information of the low-bitrate-encoded image is at least one of a coding block quantization parameter (QP), a prediction error coefficient, prediction mode information, or motion vector information of an image encoding technique.

13. A transmission system, comprising one or more transmission devices, at least one transmission device of the one or more transmission devices comprising:
one or more processors, at least one processor of the one or more processors configured to generate model data through machine learning, the model data for generating improved data from low-bitrate-encoded data obtained by encoding original data with a low bitrate; and
a transmitter configured to transmit the low-bitrate-encoded data along with the model data outside the at least one transmission device of the one or more transmission devices, wherein
at least one processor of the one or more processors is configured to select the model data to be transmitted with the low-bitrate-encoded data, from a plurality of sets of model data, based on information related to distribution-requested content including at least one of comment information posted by a viewer of the distribution-requested content and tag information added by a viewer of the distribution-requested content.

14. An image reception device, comprising:
a receiver configured to receive, from an image transmission system, model data generated through machine learning and low-bitrate-encoded images obtained by encoding original images with a low bitrate, the model data for generating improved images from the low-bitrate-encoded images; and
a processor configured to generate the improved images of the low-bitrate-encoded images from the received low-bitrate-encoded images and the received model data, wherein
the model data received by the receiver is selected from a plurality of sets of model data, based on information related to distribution-requested content including at least one of comment information posted by a viewer of the distribution-requested content and tag information added by a viewer of the distribution-requested content.

15. The image reception device of claim 14, wherein data used in the machine learning is meta information of the low-bitrate-encoded image, and
wherein the meta information of the low-bitrate-encoded image is at least one of a coding block quantization parameter (QP), a prediction error coefficient, prediction mode information, or motion vector information of an image encoding technique.

16. A reception device, comprising:
a receiver configured to receive, from a transmission system, model data generated through machine learning and low-bitrate-encoded data obtained by encoding original data with a low bitrate, the model data for generating improved data from the low-bitrate-encoded data; and
a processor configured to generate the improved data from the received low-bitrate-encoded data and the received model data, wherein
the model data received by the receiver is selected from a plurality of sets of model data, based on information related to distribution-requested content including at least one of comment information posted by a viewer of the distribution-requested content and tag information added by a viewer of the distribution-requested content.

17. A non-transitory computer-readable recording medium, storing a computer program that causes a processor to execute the transmission and reception method of claim 8.

* * * * *